United States Patent Office 3,456,091
Patented July 15, 1969

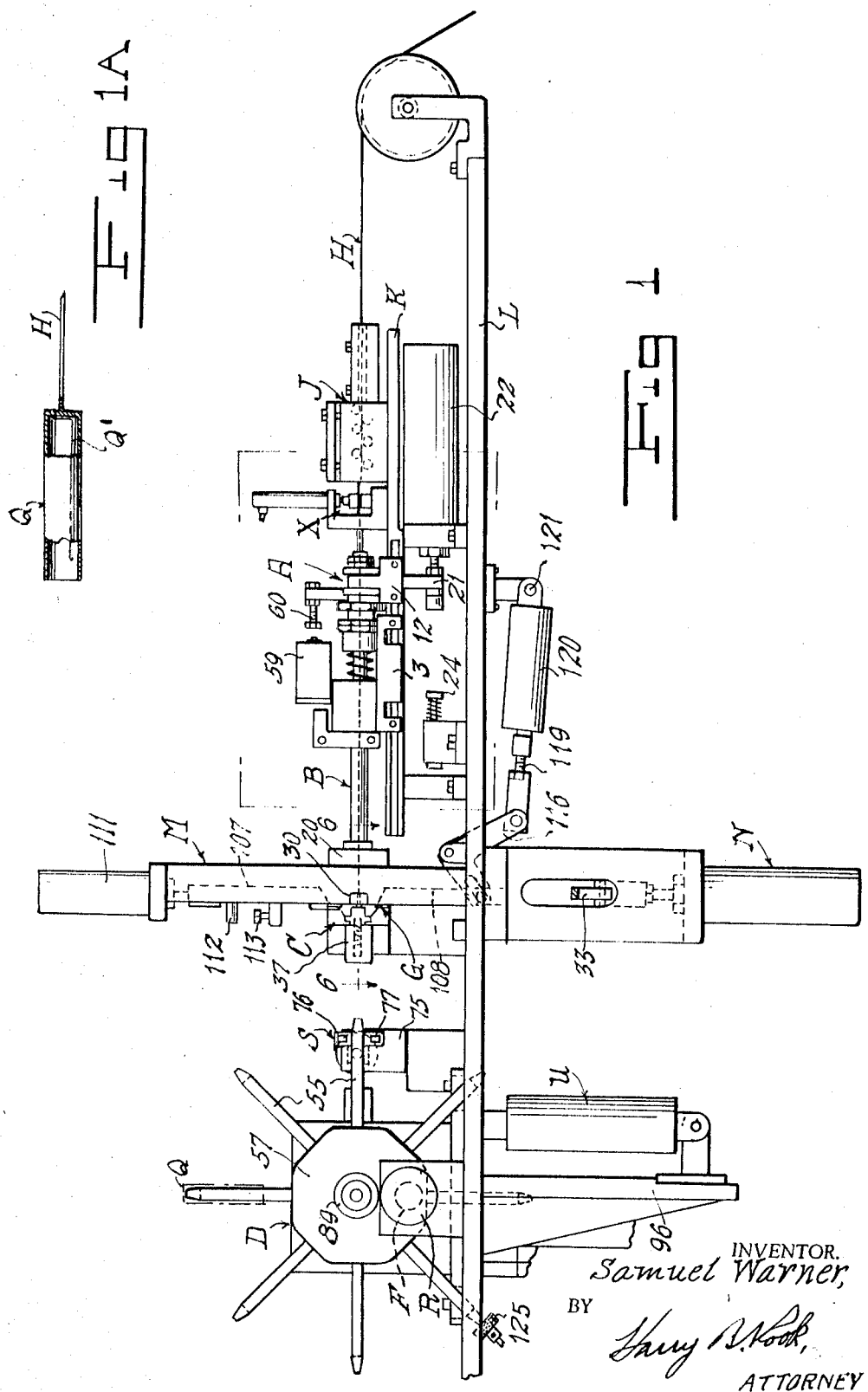

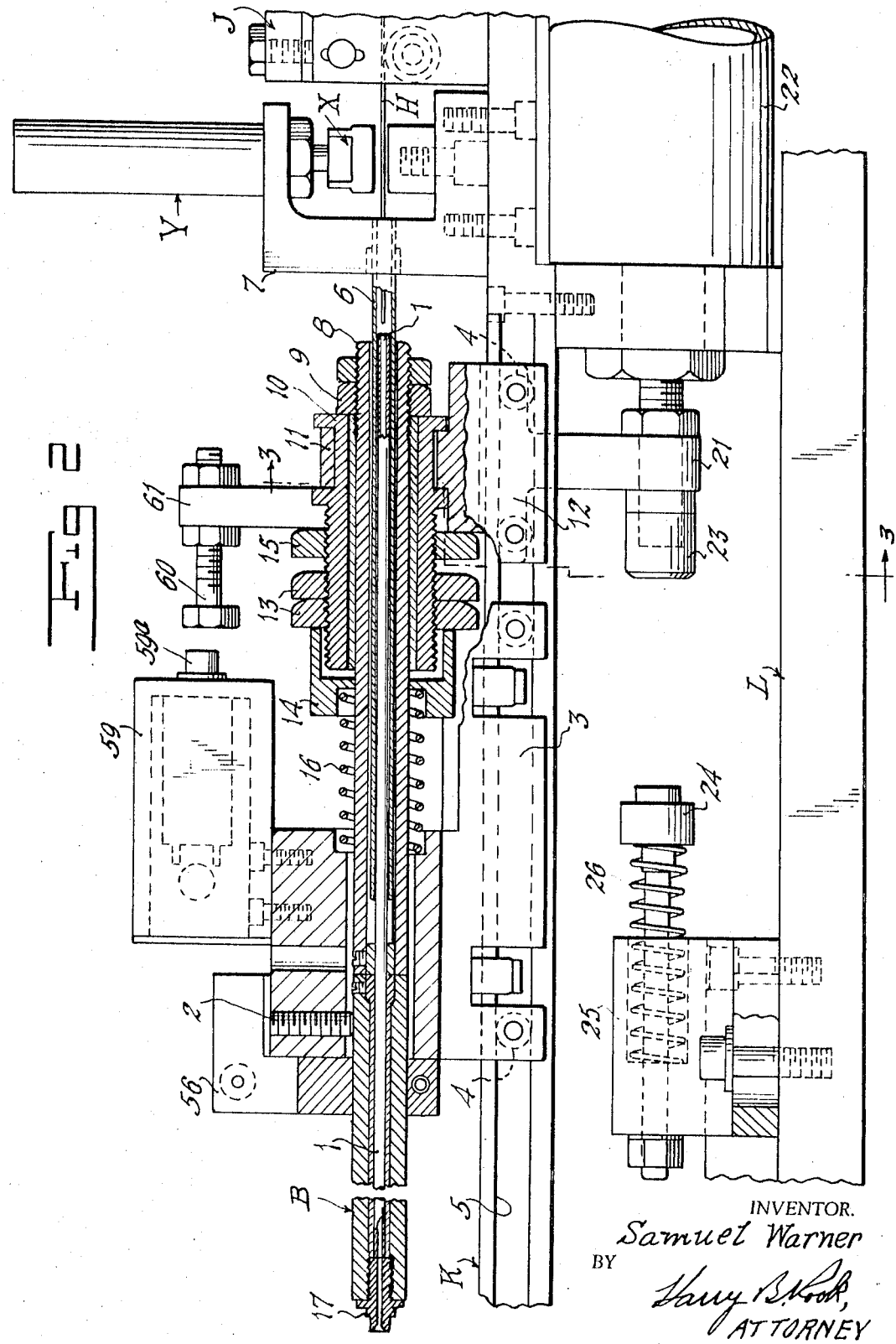

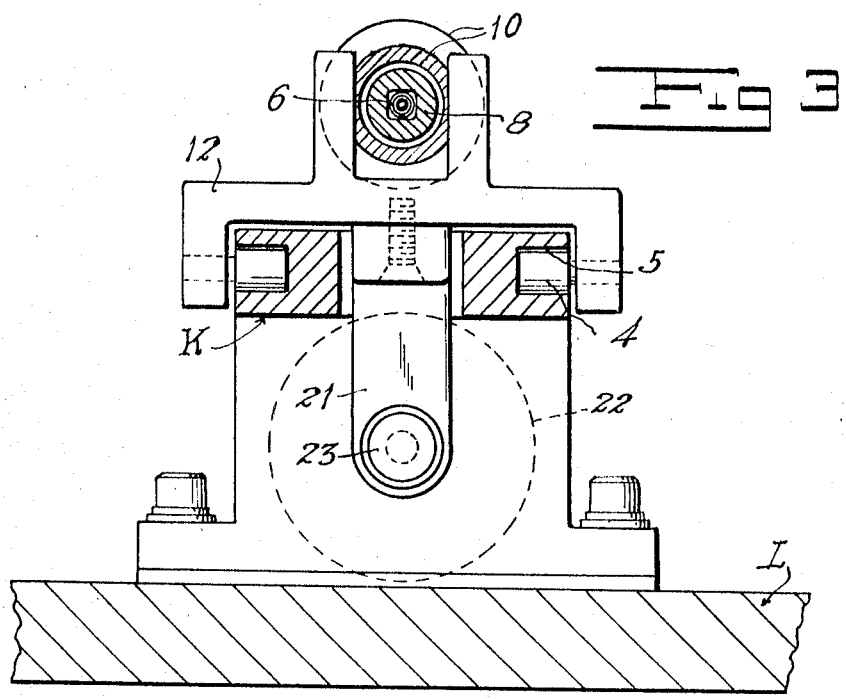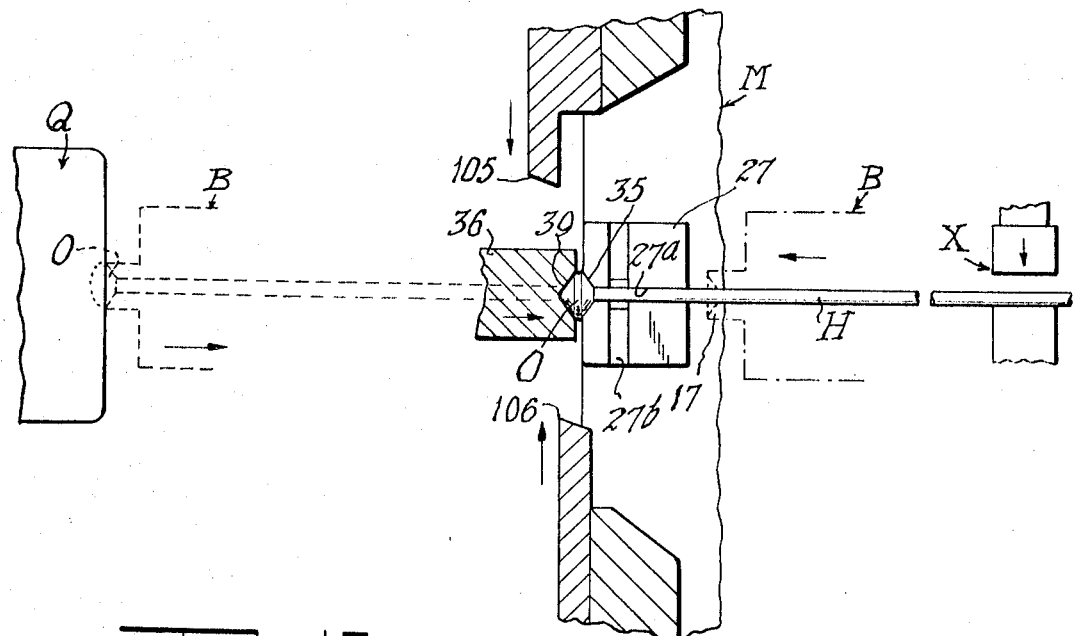

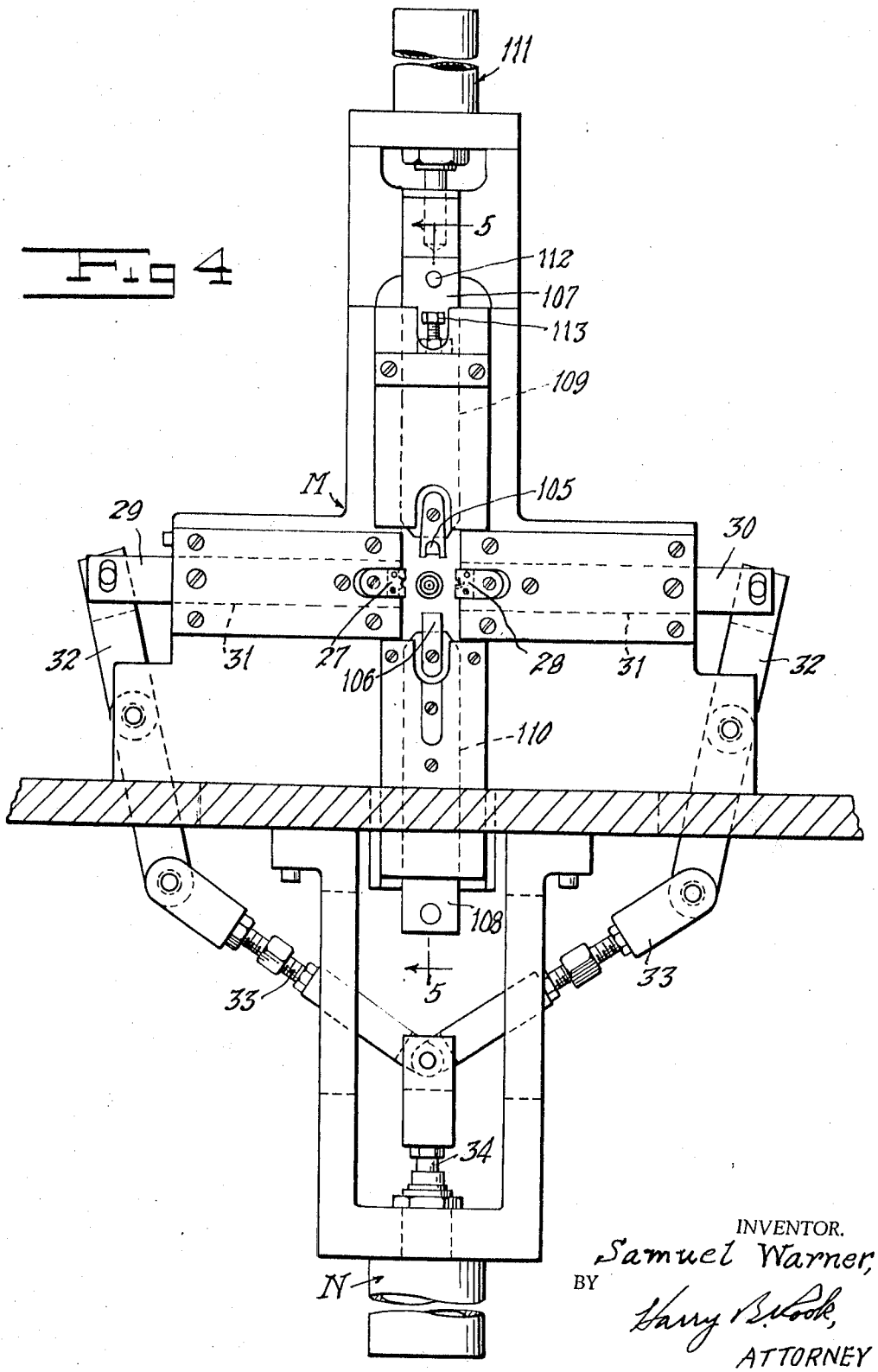

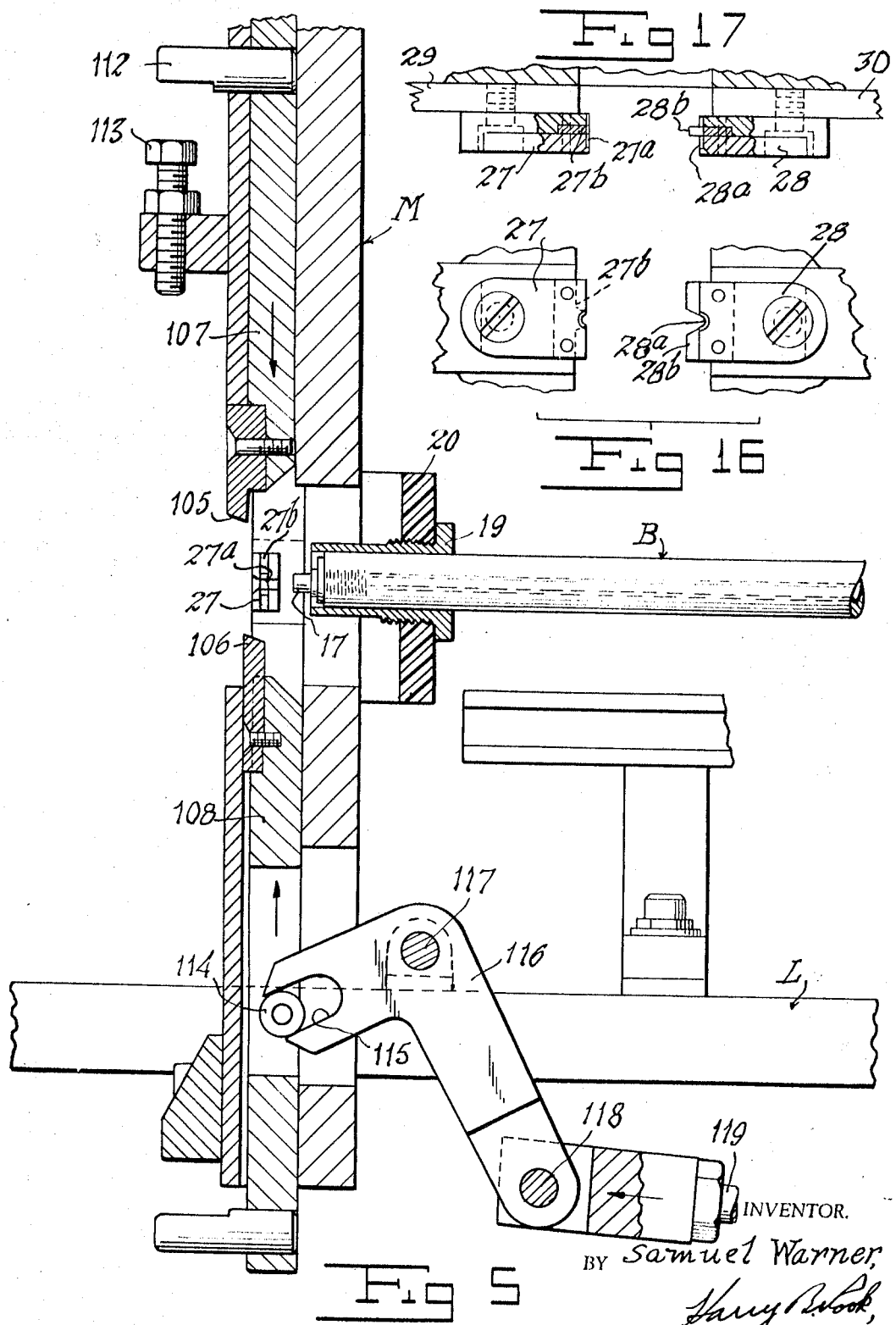

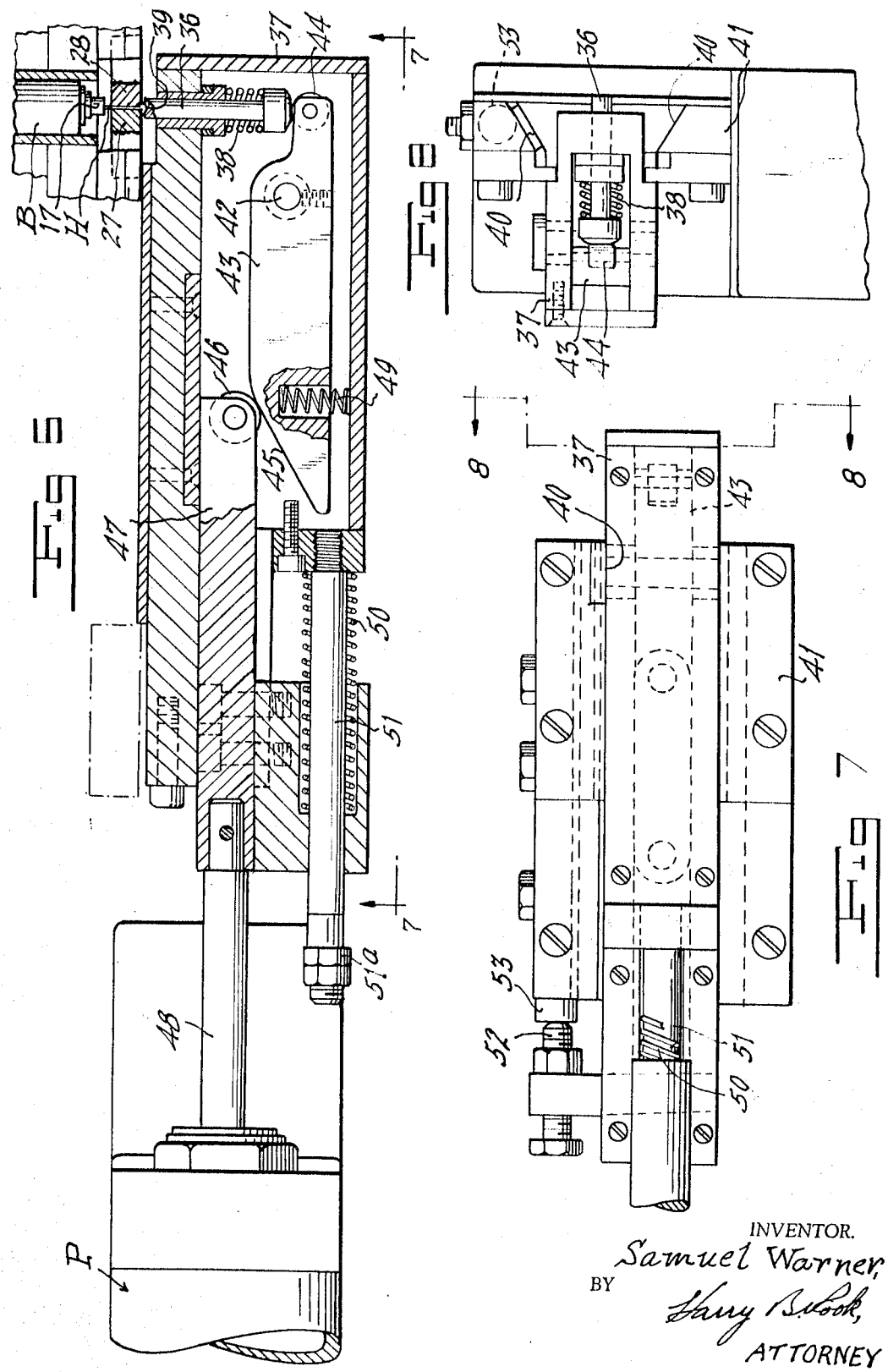

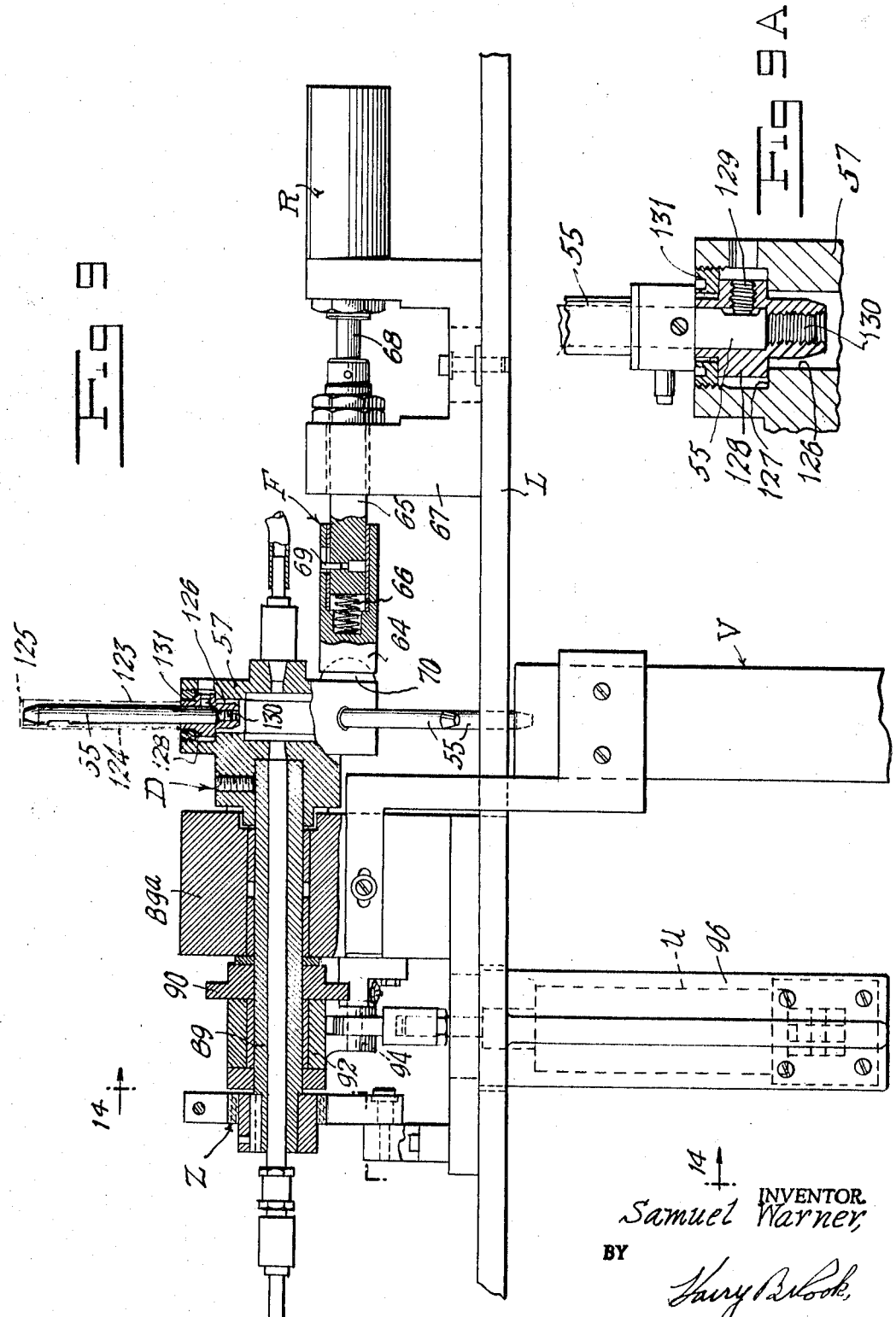

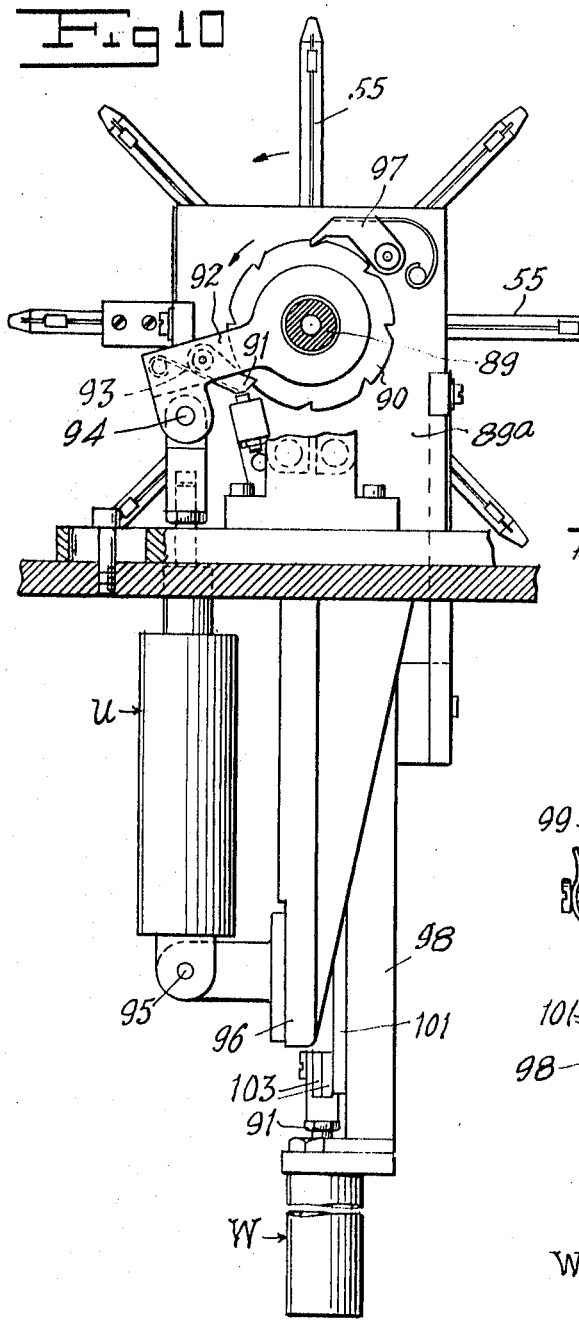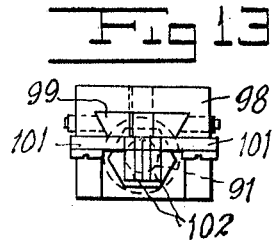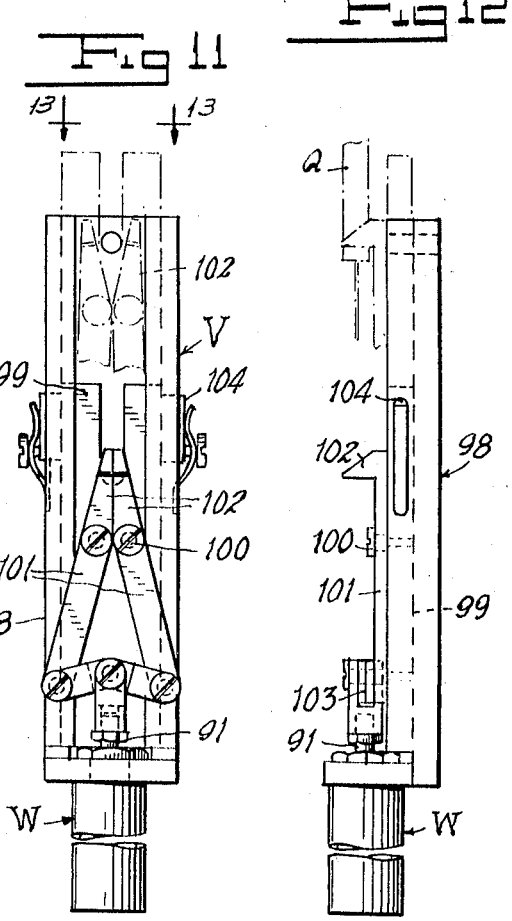

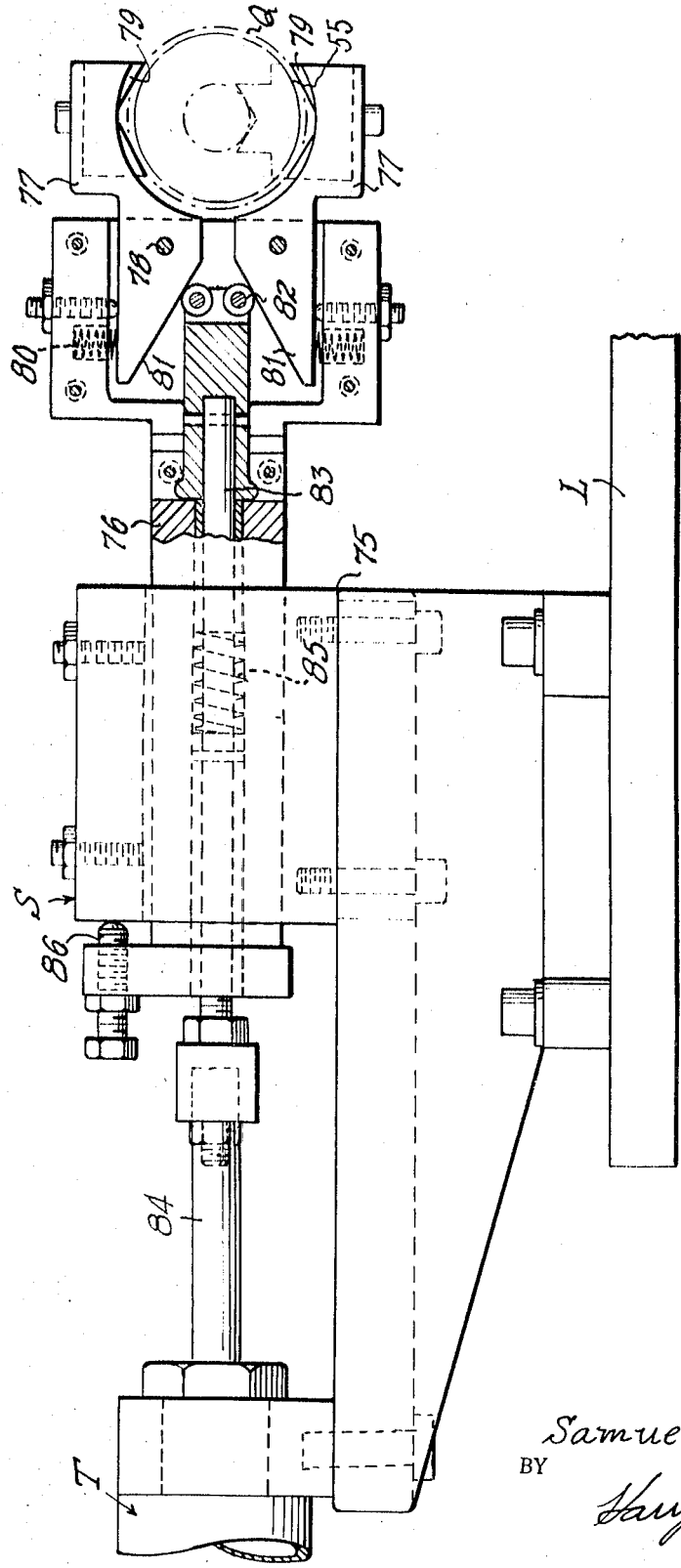

3,456,091
MACHINE FOR FEEDING, HEADING, AND WELDING LEAD WIRE TO ANOTHER ELECTRICAL ELEMENT
Samuel Warner, Hillside, N.J., assignor to Samuel Jacobs Warner and Harold Tooker Williams, as trustees under a trust agreement dated June 29, 1960, for the Employees' Profit-Sharing Plan of Jayal Products, Inc., Newark, N.J.
Filed Mar. 8, 1967, Ser. No. 621,594
Int. Cl. B23k 37/02
U.S. Cl. 219—103        15 Claims

ABSTRACT OF THE DISCLOSURE

A machine wherein a wire passes through a reciprocable tubular electrode to means including wire clamp die jaws for guiding and holding the wire for a swaging die which forms a head on the leading end of the wire, the wire is pulled by movement of the electrode in one direction with one end abutting the head to press the head into yielding adjustable pressure contact with an element, e.g. a transistor can, clamped in predetermined position on an adjustable holder-electrode while a current controlled by said contact passing through the electrode and said element welds said head to the element, after which means momentarily clamps the wire against movement and the tubular electrode moves in the opposite direction, cutting mechanism severs the wire adjacent the head-forming means, and said element is automatically ejected from said holder.

Background of the invention

The invention relates to the art of welding the end of a lead wire to another electrical element, including the feeding of the wire from a supply and holding it in contact with another element. It is known in the art to provide jaws to hold the element to be welded to the wire and to pull the wire from a supply and hold it in contact with the element while it is being welded, the wire being cut before it is welded. In the prior art machines complicated wire gripping and holding means are required, the means for forming and controlling the welding circuit are complex and expensive, and there are no reliable means for regulating the pressure of the wire against the element during the welding operation.

Summary of the invention

The present invention overcomes the above-enumerated deficiencies in or objections to the prior art machines. A primary object of the invention is to provide a machine of this character which shall be simple in construction and reliable and durable in operation to make a sound welded connection between a wire and even a thin metal element, and which shall include a novel combination of means including radial arm electrodes for feeding and locating the elements in succession in predetermined welding position, means for forming a head on the wire including clamp jaws for guiding and holding the wire for a swaging die, means utilizing a tubular electrode for guiding the wire and for abutting said head to pull the wire and press the head under adjustable yielding pressure into contact with said element upon longitudinal movement of the tubular electrode, means for regulating the pressure of said head against the element and for controlling the flow of current in a welding circuit upon pressure of said head against the element, means for cutting the wire after the welding operation, and clamp means for holding the wire stationary upon retraction of the electrode after completion of the weld, and means for removing the element from the support electrode.

Brief description of the drawings

FIGURE 1 is a schematic side elevational view of a machine embodying the invention;

FIGURE 1a is a side elevational view, with portions broken away of a transistor can and a lead wire welded thereto;

FIGURE 2 is an enlarged central vertical sectional view, with portions shown in side elevation, of the part of the machine enclosed within the rectangle indicated by the broken line of FIGURE 1;

FIGURE 3 is a framgentary transverse vertical sectional view on the plane of the line 3—3 of FIGURE 2;

FIGURE 4 is an elevational view taken from approximately the plane of the line 4—4 of FIGURE 1; with parts omitted;

FIGURE 5 is an enlarged fragmentary central vertical sectional view approximately on the plane of the line 5—5 of FIGURE 4, with portions omitted;

FIGURE 6 is an enlarged fragmentary horizontal sectional view approximately on the plane of the line 6—6 of FIGURE 1 showing the swaging mechanism;

FIGURE 7 is an elevational view approximately on the plane of the line 7—7 of FIGURE 6;

FIGURE 8 is an elevational view approximately on the plane of the line 8—8 of FIGURE 7 with the cover plate removed;

FIGURE 9 is an end elevational view, partially in section of the can holding and feeding mechanism, and also showing the second electrode for connecting the can in the welding circuit, portions being broken away and shown in vertical section;

FIGURE 9a is an enlarged fragmentary sectional view of the can holder-electrode adjustable mounting;

FIGURE 10 is a side elevational view approximately on the line of the plane 10—10 of FIGURE 9;

FIGURE 11 is a front elevational view of a portion of the can ejecting mechanism;

FIGURE 12 is a front elevational view thereof;

FIGURE 13 is a top plan view of the can ejecting mechanism viewed from the plane of the line 13—13 of FIGURE 11;

FIGURE 14 is an enlarged elevational view of the can positioning mechanism shown in FIGURE 1, with portions broken away and shown in section;

FIGURE 15 is an enlarged schematic composite sectional and elevational view illustrating the forming of the head on the wire and the pressing of the head into contact with the can during the welding operation;

FIGURE 16 is an enlarged fragmentary elevational view of the clamp die jaws and the wire guides, and FIGURE 17 is a plan view of the parts shown in FIGURE 16.

Description of the preferred embodiment

Specifically describing the illustrated embodiment of the invention, the machine includes a wire feeding mechanism generally designated A, one part B of which serves as a wire pulling electrode, a wire heading mechanism generally designated C, a can holding and feeding mechanism D, a welding mechanism including the electrode B, having associated therewith a circuit control means E and an electrode F to momentarily contact the can holding and feeding mechanism, and a wire cutting mechanism G.

The wire H is shown as passing from a supply over a pulley I through a wire straightening mechanism J of known construction and thence through a tube 1 which passes through and is connected to the electrode B which is tubular and is separably connected as by a set screw 2 to an auxiliary feed block 3 mounted by rollers 4 in guide grooves 5 in a superframe K carried by a main frame generally designated L. The tube 1 is telescopically slidable in a larger tube 6 one end of which is fixedly connected to a bracket 7 secured on the sub-frame and the other end of which loosely extends partially through a tube 8 one end of which abuts the electrode tube B while its other end has screw threaded thereon stop nuts 9 that abut an adapter bushing 10 which is mounted in a bearing lug 11 on the main feed block 12 and has the tube 8 extending therethrough. Screw threaded on the adapter are adjustable nuts 13 against one of which abuts a bearing cup 14 one end of which abuts one of the nuts 13 while its other end is abutted by one end of a compression spring 16 the other end of which abuts the auxiliary feed block 3 so that the spring tends to push the feed blocks apart. The bushing 10 is locked in position by a jam nut 15.

A heat resistant bushing 17 is separably connected to the end of the electrode tube and the sections 3 and 4 are normally positioned so that said bushing is normally located at one side of the wire clamping dies 27, 28 of the head forming mechanism as best shown in FIGURE 5, the end of the electrode being supported and slidable in a guide bushing 19 fitted into an insulating support bracket 20 secured to an auxiliary frame M. The main feed block 12 is connected by an arm 21 to the piston rod of a fluid pressure motor 22 so that the main feed block 12 may be reciprocated first in the direction to move the auxiliary feed block 3 through the spring 14 and thereby move the electrode tube from said normal position to the welding position at which the element, for example the transistor can Q is positioned by the can holding and feeding mechanism D, after which the electrode is returned to its normal position. Movement of the feed blocks 12 and 3 toward the welding position is limited by abutment of a finger 23 on the arm 21 with a stop plunger 24 that is reciprocably mounted in a bracket 25 secured on the frame K. A compression spring 26 yieldingly resists movement of the plunger 24 by the arm 21.

The head forming mechanism C is best shown in FIGURES 1, 4 and 5 through 8 and comprises two complemental wire clamping die jaws 27 and 28 disposed outwardly and at opposite sides of the end of the electrode tube and mounted on and carried by the respective slide bars 29 and 30 mounted in guideways 31 supported on the auxiliary frame. The die jaws have complemental grooves 27a and 28a in their opposed faces to engage and clamp the wire from opposite sides thereof when the dies are reciprocated toward each other by the levers 32, links 33 and fluid pressure motor N whose piston rod 34 is pivotally connected to the links 33. The jaws have the complemental wire guides 27b and 28b separably secured therein to guide the wire accurately into said complemental grooves. The sides of the dies are preferably formed with complemental recesses 35 which, when the jaws are clamping the wire, form a frusto-conical recess (FIGURE 3). Only the jaws 27a and 28a need to be changed to accommodate wires of different diameters.

In setting up the machine for operation, the wire is first manually threaded and pulled through the tube 1 and the electrode tip bushing 17 so that the leading end of the wire projects beyond the die jaws a distance sufficient for the formation of a head on the wire. This projecting end of the wire is clamped between the die jaws and while so clamped, the wire is headed by a swaging die 36 which is in the form of a rod reciprocably mounted in a carrier 37 and normally biased into inoperative position by a spring 38. The end of the die has a head forming recess 39 (FIGURES 6 and 15) coactive with the recess 35 in the die jaws so that when the swaging die is forced against the end of the wire, the wire is upset to form a head O thereon. The swaging die is normally disposed at one side of the electrode tube and the die jaws, and at the proper time is moved into opposed relation to the die jaws and the end of the wire and then actuated toward the dies to head the wire. As shown, the carrier 37 is slidably mounted in a dove-tail guideway 40 in a supporting bracket 41, and in the carrier is pivotally mounted at 42 intermediate its ends a lever 43 at one end of which is a roller 44 abutting the end of the swaging die 36. The other end of the lever has a bevel surface 45 over which rides a roller 46 carried by the end of a driving rod 47 movable relatively to the carrier and connected to the piston rod 48 of a fluid pressure motor P that is mounted on the frame of the machine. A compression spring 49 normally causes the lever to follow the roller 46 and a spring 50 on a guide rod 51 normally tends to cause relative movement of the carrier and the drive bar in one direction. In FIGURE 6 of the drawings, the carrier and swaging die are shown in their operative positions and upon movement of the drive bar to the left in the figure, the lever 43 is first released from engagement with the swaging die and thereafter the carrier is retracted to its normal position. Upon movement in the other direction, the carrier is first slid by the drive bar until a stop screw 52 on the carrier engages an abutment 53 on the frame, whereupon the drive bar moves independently of the carrier and swings the lever to actuate the swaging die into coactive relation to the wire clamping dies.

After the head has been formed on the wire, the feed blocks are actuated to move the tip 17 of the electrode into abutment with the head and the feed blocks are then actuated farther in the same direction to bring the head into contact with a can Q that is mounted on one of the can holding arms 55 of the can holding and feeding mechanism D, the can being held with its closed bottom end abutting the end of the arm 55 and in opposed relation to the head on the wire as best shown in FIGURE 15. The head is forced into contact with the end of the can under yielding pressure afforded by the spring 14 between the feed blocks 3 and 12, and is at that time welded to the can by a welding current that passes through the electrode tube and tip 17 from a circuit wire connected to a terminal 56, thence through the wire head to the can and then to the body portion 57 of the can holder to the electrode F that is pressed into contact with the can holder as best shown in FIGURE 9, the electrodes being connected in a suitable welding circuit generally known in the art. The circuit is controlled by a circuit control mechanism comprising a normally open micro switch 59 rigidly mounted on the feed block 3 and whose operating button 59a is actuated by an adjustable screw 60 mounted in an arm 61 on the feed block 12. The microswitch is actuated to close the circuit when a predetermined pressure is set up between the wire head O and the can, which can be regulated by adjusting the screw 60.

The electrode F is preferably grounded and as shown in FIGURES 1 and 9 comprises a contact portion 64 slidable on a main portion 65 with a spring 66 interposed between them. The section 65 is slidably mounted in a bearing bracket 67 and is connected to a piston rod 68 of a fluid pressure motor R mounted on the bracket 67. There is a slot and pin connection 69 between the two sections 64 and 65 to limit relative movement of the sections. Normally the contact section 64 is out of contact with the body portion of the can holding and feeding means, and in timed relation to the movement of the headed end of the wire into contact with the can, the electrode F, contact portion 64, is actuated into contact with a contact member 70 on the body portion of the can holding and feeding means, and approximately simultaneously with, or slightly before, the contact of the wire head with the can.

The welding current passes from the body portion of the can holder through the arm 55 into the can so that in effect the arm also serves as an electrode. Means is provided for positively gripping and holding the can in the welding position on the arm. This means is generally denoted S in FIGURES 1 and 14 of the drawings and comprises a bracket 75 fixed on the frame K between the can holding and feeding mechanism D and the head forming mechanism, in which is slide bar 76 in the outer end of which are mounted a pair of can clamping jaw levers 77 pivotally intermediate their ends at 78 that have face pieces 79 normally spaced apart a distance greater than the diameter of the can that is illustrated by dot and dash lines in FIGURE 14. These jaw faces are normally swung apart by springs 80 and are actuated toward each other to grip the can between them by a coaction of beveled surfaces 81 on the levers with rollers 82 on a slide rod 83 which is slidably mounted in the bar 76 and is connected to the piston rod 84 of a fluid pressure motor T. The slide rod is biased by a spring 85 in the direction to move the rollers 82 to permit the jaws to swing apart and is actuated in the other direction by the motor T and initially moves with it the bar 76 from its normal position at one side of the arm 55 until movement of the bar is interrupted by engagement of a screw 86 on the bar with a bracket when the jaws are in position to grip a can on the arm 55 as shown in FIGURE 14, after which movement of the rod continues in the same direction to actuate the jaw levers into can clamping position. It will be understood that the motor T will be operated in timed relation to the movement of the can holding and feeding mechanism so that the jaws will clamp and firmly hold the can after the arm 55 has moved the can to the welding position.

After completion of the welding operation, the wire is held momentarily against backward movement by a clamping mechanism X (FIGURES 1 and 2) which is operated by a fluid pressure motor Y in timed relation to the reciprocation of the feed blocks 3 and 4; and the electrode tube 1 is then retracted to its normal position along the wire which remains welded to the can; and the wire is then severed by the cutting mechanism G which is disposed on the main frame between the head forming mechanism and the can feeding and holding mechanism. The cutting mechanism is best shown in FIGURES 1, 4, 5 and 15 and comprises coactive upper and lower cutters 105 and 106 that are carried by the respective slide bars 107 and 108 mounted in the respective guideways 109 and 110 in the superframe M. The slide 107 is connected to a fluid pressure motor 111 mounted on the superframe and carries a stop stud 112 coactive with an adjustable stop screw 113 mounted on the frame for limiting downward movement of the cutter. The slide bar 108 is slotted and has journaled in the slot a roller 114 located in the notch 115 in one arm of a bell crank lever 116 that is pivotally mounted at 117 on the frame. The other arm of the bell crank lever is pivotally connected at 118 to the piston rod 119 of a fluid pressure motor 120 that is pivotally mounted at one end 121 to a bracket depending from the frame K. The two motors 111 and 120 are actuated in timed relation to each other and to the retraction of the electrode tube 1 to its normal position so that the cutters are brought into coacting severing relation to the wire and cut the wire so as to leave a predetermined length of the wire projecting from the electrode tube and beyond the wire clamping die jaws 27 and 28 of the head forming mechanism. After the wire has been cut, the can with the wire attached thereto is moved from the welding position to a can ejecting position.

In the present instance, the can holding and feeding mechanism is shown as provided with eight arms 55 projecting equi-distantly radially from the body portion 57 which is shown as mounted on a horizontal axis at the end of a tubular shaft 89 journaled in bracket 89a (FIGURES 1, 9 and 10). The cans may be applied to the arms in any suitable manner, automatically or by hand but the body portion 57 is rotated step-by-step automatically to move the arms in succession from the loading position to the welding position and from the welding position to an ejecting position. Ratchet disk 90 is mounted on the shaft 89 and is actuated in the direction to move the arms from the loading position to the welding position by pawl 91 pivotally mounted on a pawl arm 92 which is journaled for rotation on the shaft 89, the pawl being normally pressed into engagement with the ratchet by a spring 93. The pawl arm is pivotally connected at 94 to the piston rod of a fluid pressure motor U one end of which is pivotally connected at 95 to a suspension bracket 96 depending from the main frame. The motor U oscillates the pawl arm 92 in timed relation to the feeding of the headed wire to the can so as to rotate the body 57 step-by-step and move the can bearing arms successively into welding position. A back stop pawl 97 is provided to prevent backward rotation of the body portion 57.

The invention also contemplates both lateral and longitudinal adjustment of the can holding arms 55 relative to the body portion 57 so as to properly locate the end of the can with respect to the head on the wire. FIGURE 9A illustrates means for achieving these adjustments. The body portion 57 has a radial opening 126 for each arm and each opening has a counterbored portion at the inner end of which is a shoulder 127 on which is seated one side of a flange on an adapter 128 which has an opening therethrough into which the arm 55 is slidable and locked by a set screw 129. The inner end of the arm rests upon an adjustment screw 130 threaded into the adapter, and upon loosening of the screw 129 and rotating the screw 130, the arm 55 may be longitudinally adjusted to lock its outer end in proper relation to the wire head at the welding position. The arm 55 is also laterally adjustable in that the adapter is laterally movable in the opening 126, and the adapter is held in adjusted position by a clamping collar 131 that is screwed into the counterbored portion of the opening 126 and abuts the side of the flange of the adapter opposite the shoulder 127 in such a way as to clamp the adapter between said collar and said shoulder.

It is desirable that the cans be automatically removed from the arms 55 and for this purpose is shown a can ejecting mechanism V (FIGURES 1, 11, 12 and 13) which includes a frame 98 suspended from the main frame and having a slide plate 99 mounted therein for vertical movement between the lowermost vertically disposed can arms. On the slide are pivoted at 100 a pair of levers 101 having juxtaposed jaws 102 at their upper ends and being connected at their lower ends by links 103 to the piston rod 91 of a fluid pressure motor W. Normally the slide 99 and the jaws are at their lower positions as shown in FIGURE 11 and the jaws are in abutting relation to each other. In timed relation to the movement of the can holding arms, the slide is moved upwardly into the position indicated by dot and dash line in FIGURES 11 and 12 and the jaws are opened at opposite sides of the can Q that is shown in broken lines in FIGURE 12. Then upon descent of the slide the jaws are simultaneously moved toward each other and downwardly so as to grip the can between them and pull it off the arm 55. The can may be removed from the jaws 102 in any suitable manner. If desired the control apparatus for the motor W may be adjusted to momentarily elevate and open the jaws after the can has been entirely removed from the arm, thereby to drop the can by gravity from the jaws. Suitable spring pressed blocks 104 may be provided for frictionally resisting movement of the slide in both directions.

It is desirable to provide some means such as a friction brake mechanism Z associated with the shaft 89 to prevent overrunning of the body portion and arms of the can feeding and holding mechanism, thereby to ensure accurate location of the cans at the welding position and at the can ejecting position.

While the head on the wire may be of different shapes and sizes, according to requirements, it is desirable that the head have the frusto-conical shape best shown in FIGURE 15 of the drawings. This shape provides substantial metal in the head and also ensures such a distribution of the welding heat as to reduce the tendency for the crystallization or burning of the can wall and of the wire at the base of the head.

This machine is capable of making a sound weld between the wire, the can and a thin metal tab Q' inside the can; for example, a sleeve of insulation 123 is slid onto the arm 55 and has a longitudinal groove 124 leading into a transverse slot 125 in one end to locate and hold the L-shaped tab.

The machine also provides for the making and welding of lead wires of various lengths for example, from three-quarter to five inches. To this end the bracket 89a has a screw and slot connection to the frame providing for movement of the arms 55 toward and from the cutter and the electrode B, and the ground connector F is similarly adjustable to maintain proper relation to the body 57. Also the bracket 25 of the stop 24 for the main electrode feeding movement is adjustable on the frame L. This adjustment of the stop 24 also provides for variations in the extent of travel of the electrode B toward the can on the arm 55 before the beginning of yielding pressure of the wire head against the can. To compensate for varying positions of the can, the can clamping mechanism S is also adjustably mounted so that the jaws may properly engage the can Q on the can holding arm 55.

It will be understood by those skilled in the art that any suitable electronic or mechancal control apparatus may be used for causing the several mechanisms to operate in proper timed relation to each other as hereinbefore described.

I claim:

1. A machine for welding wire to another element wherein the wire is moved longitudinally and its leading end is pressed into contact with said element while a welding current passes through the wire and said element characterized in that there are: means comprising element holder-electrodes adjustable to feed elements in succession to and hold them at a predetermined welding position, an elongated wire-pulling electrode tube for the passage of the wire therethrough reciprocable from a normal position to a welding posiiton, head-forming means including wire-clamping die jaws having wire guiding and receiving grooves disposed outwardly of and at opposite sides of one end of the tube and the wire projecting therefrom when the tube is in said normal position and a swaging die coactive with said jaws for swaging a head on the leading end of the wire outwardly of said end of said tube, a cutting mechanism for said wire disposed between said die jaws and said means for holding said element, means including said tube and mechanism for moving the tube first in one direction with said end thereof abutting said head on the wire from said normal position to pull the wire and yieldingly press the head thereof into contact with said element and then to return said tube in the opposite direction along said wire successively past said cutting mechanism and said head-forming mechanism to said normal position, clamp means to hold said wire against retraction during the return movement of said tube and to release said wire during the wire pulling movement of said tube, means including said wire pulling and electrode tube for conducting and controlling the flow of current for a welding circuit to said wire, upon pressure of said wire against said element, and means including another electrode for conducting current for said welding circuit to said element holder-electrodes.

2. A machine as defined in claim 1, with the addition of means for actuating said head-forming means, said electrodes, and said cutting mechanism in timed relation to each other and to the movement of said electrode tube.

3. A machine as defined in claim 1, wherein the means for holding said element includes a body portion rotatable about an axis with said element holder-electrodes comprising a plurality of radial arms on said body portion each to removably receive an element and means for rotating said body portion step-by-step in timed relation to movement of said electrode tube to locate an element on one of said arms in said predetermined welding position at the end of each step.

4. A machine as defined in claim 3, with the addition of clamp means including jaws normally disposed at one side of the one of said arms that is located at said welding position, and means for actuating said jaws first to grip and firmly hold said element momentarily during the welding operation and then to release the jaws from said element and return the jaws to their normal position.

5. A machine as defined in claim 1, wherein the means for forming a head includes opposed wire-clamping die jaws movable toward and from each other and having complemental wire guides and grooves for said projecting end of the wire to grip said wire with one end thereof projecting from between the jaws and to release the wire, respectively, and a swaging die and means for moving it successively from a normal position at one side of said tube and in spaced relation to said die jaws to a position in opposed relation to said end of said wire and toward said jaws to swage and form a head on the end of the wire.

6. A machine as defined in claim 5 wherein said swaging die comprises a ro dreciprocably mounted in a carrier, means reciprocably mounting said carrier to move said swaging die from a normal position at one side of said electrode tube and said die jaws into opposed relation to said die jaws and to return to said normal position, and means for reciprocating said carrier and for actuating said swaging die toward said die jaws including a lever pivotally mounted intermediate its ends on said carrier with one end engaging one end of said swaging die, a drive rod yieldingly connected to said carrier for movement therewith and relative thereto and having an operative connection with said lever to swing the same and actuate said swaging die upon such relative movement of said drive rod and said carrier, and stop means to limit movement of said carrier with said drive rod.

7. A machine as defined in claim 1 wherein said means for moving said electrode tube includes two sections in one of which said electrode tube is rigidly mounted and means mounting them for movement relatively to each other, there being yielding means interposed between said sections, and means for postively actuating the other section, whereby said electrode tube may yieldingly press the head on the wire into contact with said element when the first-mentioned section is moved toward said element through said yielding means by said other section.

8. A machine as defined in claim 7 with the addition of welding circuit control means including two parts, one mounted on each of said sections to close the circuit upon contact of said head with element under predetermined pressure.

9. A machine as defined in claim 8 wherein one of said parts is a normally open microswitch connected in the welding circuit and having an operating button, and the other part is a screw adjustably mounted in the other part to actuate said button during relative movement of said sections as they move toward said element.

10. A machine as defined in claim 1 wherein said welding circuit includes a terminal mounted on said electrode tube and to which one wire of the circuit is connected, and a ground connection of the second-mentioned electrode.

11. A machine as defined in claim 1 wherein said means to feed said elements comprises a body portion, and means mounting said element-holder electrode for longitudinal and lateral movement in said body portion.

12. A machine as defined in claim 1 wherein said means to feed said elements comprises a rotatable body portion and said element holder-electrodes comprise radial arms, and said body portion has a recess for each arm, and with the addition of means mounting each arm in its recess for adjusting movement longitudinally and laterally of the arm.

13. A machine as defined in claim 1 wherein said means to feed said elements comprises a rotatable body portion and said element holder-electrodes comprise radial arms, and said body portion has a recess for each arm wherein there is a shoulder, and with the addition of an adapter seated on said shoulder for movement laterally in said recess and having an opening therethrough in which one arm is slidable, a screw in said opening abutting the end of said arm to adjust it longitudinally, a set screw to hold the arm in adjusted position, and a screw collar in said recess to clamp said adapter between said collar and said shoulder.

14. A machine as defined in claim 1 wherein the wire-clamping jaws have complemental grooves in their opposed faces to receive and grip the wire that projects from the tubular electrode when the jaws are closed, and each jaw has a notched wire guide mounted therein each of which is complemental to the other wire guide as the jaws are closed to embrace and guide the wire into position to enter said grooves.

15. The machine as defined in claim 1 wherein there is a machine frame, and there are means mounting said element feeding means on said frame for adjustment toward and from said tubular electrode, motor means on said frame for reciprocating said tubular electrode, a stop for limiting movement of the tubular electrode by said motor means toward said element feeding means, and means adjustably mounting said stop on said frame to vary the extent of movement of tubular electrode toward said element feeding and positioning means.

References Cited

UNITED STATES PATENTS

| | | | |
|---|---|---|---|
| 2,779,858 | 1/1957 | Pityo | 219—103 |
| 3,200,471 | 8/1965 | Johnson et al. | 219—79 |
| 3,294,950 | 12/1866 | Hagner et al. | 219—103 |
| 3,299,246 | 1/1967 | Wahl | 219—79 |
| 3,321,606 | 5/1967 | Cropp et al. | 219—79 |
| 3,348,016 | 10/1967 | Fitzgerald et al. | 219—86 |

ANTHONY BARTIS, Primary Examiner

W. DEXTER BROOKS, Assistant Examiner

U.S. Cl. X.R.

219—78, 107